United States Patent [19]

Corkill et al.

[11] 4,304,284
[45] Dec. 8, 1981

[54] BEAD BREAKER FOR TUBELESS TIRES

[76] Inventors: Robert E. Corkill; Paul D. Corkill, both of 1131 W. 41st Ter., Kansas City, Mo. 64111

[21] Appl. No.: 134,908

[22] Filed: Mar. 28, 1980

[51] Int. Cl.³ .............................................. B60C 25/06
[52] U.S. Cl. .................................................. 157/1.26
[58] Field of Search ....................... 157/1.26, 1.3, 1.17

[56] References Cited

U.S. PATENT DOCUMENTS

| | | | |
|---|---|---|---|
| 2,545,483 | 3/1951 | Martin | 157/1.3 |
| 2,907,381 | 10/1959 | Newton et al. | 157/1.26 |
| 2,920,688 | 1/1960 | Lewis | 157/1.17 |
| 3,067,807 | 12/1962 | Vlasic | 157/1.26 |
| 3,237,676 | 3/1966 | Wise | 157/1.26 |

FOREIGN PATENT DOCUMENTS 461888 12/1949 Canada ............................. 157/1.26
513123  5/1955 Canada ............................. 157/1.26

Primary Examiner—James G. Smith
Attorney, Agent, or Firm—Schmidt, Johnson, Hovey & Williams

[57] ABSTRACT

A tool for breaking a tire bead away from a wheel rim and shoulder has a lever in the form of an elongated plank provided with a hook and a breaker that are wedged between the bead and the wheel lip in diametrically opposed relationship when a force is applied to the lever. The breaker is swingable on the lever plank such that when it is swung open the plank is disposed in an inclined, ramp-like manner permitting a wheel of a vehicle to be driven along the plank. After the breaker closes against a stop the tire casing is compressed, causing the bead to move downwardly along the rim away from the shoulder until the bead is effectively broken permitting tire removal.

13 Claims, 6 Drawing Figures

BEAD BREAKER FOR TUBELESS TIRES

Tubeless tires must have air tight joints with the wheels upon which they are mounted along the entire peripheries of both of the tire beads. This need results in the troublesome task of breaking the bead joints before the tire can be removed from the wheel. This problem is particularly acute for the amateur mechanic, farmer rancher or vehicle operators in remote locations who do not have access to or cannot afford to purchase expensive hydraulic bead-breaking equipment used by commerical garages. Thus, there is a real need for an inexpensive yet satifactory bead-breaking tool for easing the burden and permitting rapid removal of tires from the associated wheels.

In accordance with the present invention, an improved bead breaking device is provided which generates a sufficiently powerful force for bead-breaking through use of a lever action against a fulcrum at the outer lip of the wheel. The lever of the present tool is preferably in the form of an elongated plank disposed on an incline in a ramp-like manner so that the required bead-breaking force is provided by driving a vehicle wheel upwardly along the lever until it comes to rest above the axis of the tire being dismounted.

In practice a rim-engaging beveled hook and a beveled, tire-engaging breaker are operatively secured to the underside of the plank in spaced relationship to one another. The hook is initially wedged into place onto the lip of the wheel, whereupon the breaker is also wedged between the bead and the wheel shoulder at a point opposite to the hook. The breaker is hinged to the lever plank such that it closes in response to an applied force derived from a vehicle wheel driven onto the plank, whereupon the breaker displaces the bead away from the shoulder until it is located within the small diameter zone of the wheel hub. A stop tongue secured to the breaker and extending upwardly therefrom for engagement with the underside fo the lever plank serves to transmit the applied force through the plank to the breaker for bead breaking purposes.

IN THE DRAWING

Figure 1:
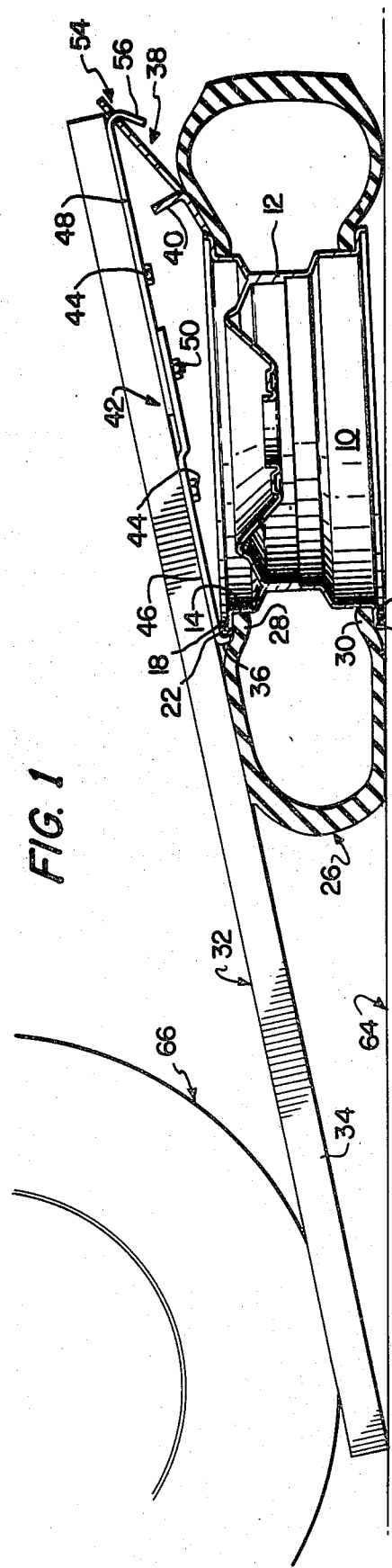
FIG. 1 is a side elevational view of one form of bead breaking tool shown in operative relation to a wheel and the tire to be removed therefrom.
Figure 2:
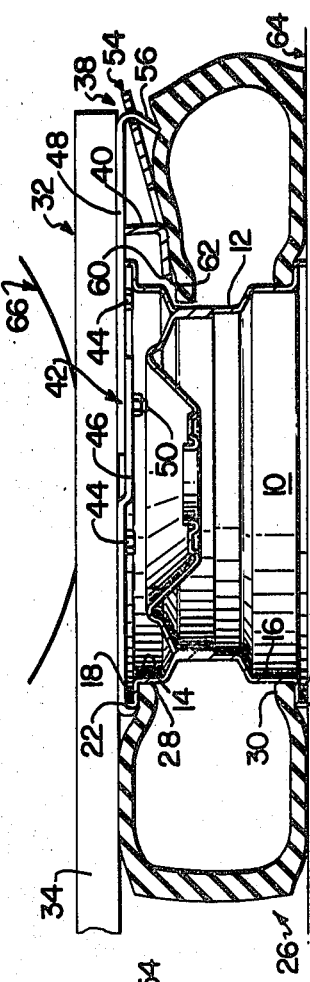
FIG. 2 is a view similar to FIG. 1 with the lever plank shown fragmentarily and illustrating the relative position of parts after the tire bead has been broken away.
Figure 3:
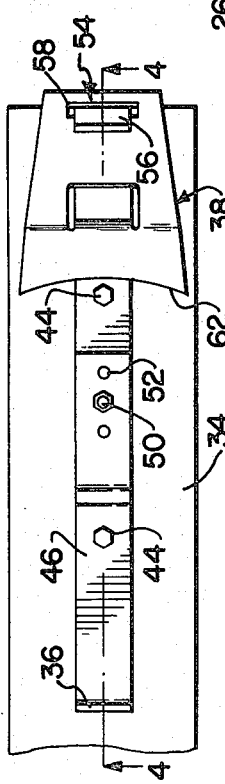
FIG. 3 is a fragmentary view showing the bottom of the tool.
Figure 4:
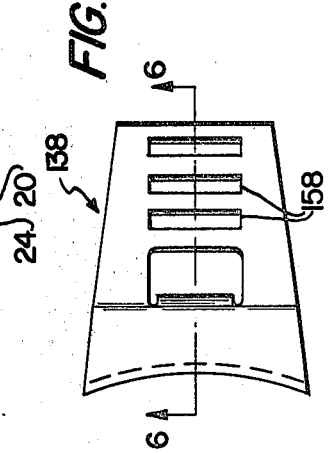
FIG. 4 is a fragmentary cross sectional view taken on line 4—4 of FIG. 3.

In FIGS. 1 and 2, a wheel 10 has a central hub 12 provided with two annular rims 14 and 16 having continuous, inwardly facing shoulders 18 and 20 terminating in circular, outturned lips 22 and 24. A tire 26 has a pair of beads 28 and 30 in surrounding engagement with rims 14 and 16 respectively and bearing against the corresponding shoulders 18 and 20. A tool 32, shown in FIGS. 1-4 for breaking the bead 28 away from the rim 14 and the shoulder 18, includes an elongated lever 34 in the form of a wooden plank and provided with a beveled hook 36 secured to the underside of the plank and adapted to engage the lip 22.

A breaker 38 spaced from the hook 36 is swingably carried by the lever plank 34 for wedging between the shoulder 18 and the bead 28 in diametrically opposed relationship to the hook 36 when a force is applied to the lever plank 34. A stop 40 limits the extent of swinging movement of the breaker 38 toward the lever plank 34, as will be explained.

An extensible support 42, releasably secured to the underside of plank lever 34 by fasteners 44, includes a pair of elongated bars 46 and 48 that are relatively overlapped at their proximal ends. Hook 36 is integral with the bar 46 at its free end remote from the bar 48. A fastener 50, releasably interconnecting the bars 46 and 48 is adapted to be received by any one of a number of holes 52 in the bar 46 rendering the tool 32 adaptable for use in connection wth wheels 10 of differing diameters.

A hinge portion 54 swingably connects the breaker 38 with the bar 48 and includes a downturned terminus 56 integral with the bar 48 at its free end remote from the bar 46. A terminus-receiving slot 58 is provided in the plate-like breaker 38 for mounting of the breaker.

The end of the breaker 38 remote from the slot 58 has a concave configuration conforming to the circular shape of the lip 22, and a lip-engaging bevel 60 on one face of the breaker 38 presents a relatively thin terminal edge 62. The stop 40 is in the nature of a tab or tongue struck from the breaker 38 between the edge 62 and the slot 58 and bent laterally such as to engage the bar 48 when the breaker 38 swings toward the bar 48 about the loop 56 of the hinge 54.

OPERATION

In use, the wheel 10 and its deflated tire 26 may be placed on any flat surface 64 whereupon the tool 32 is laid across the tire 26 such as to position the hook 36 and the bevel 60 against the lip 22 as shown in FIG. 1. This positions the lever plank 34 with its free end engaging the surface 64 such that its upper surface presents an inclined ramp, it being noted that the breaker 38 is swung open about the hinge 54 such that the stop 40 is spaced from the bar 48. Further, the edge 62 of breaker 38 is positioned as depicted in FIG. 1 adjacent the engagement between upper shoulder 18 and upper bead 28.

The inclined, ramp-like plane of the upper face of the lever plank 34 permits application of force to the lever plank 34 by use of a wheel 66 of a vehicle which may be driven upwardly along the top of the lever plank 34 from the position shown in FIG. 1 to the position illustrated in FIG. 2.

Initially, the weight of the vehicle causes the beveled edge of the hook 36 to wedge tightly into place between the tire 26 and the lip 22, especially as the wheel 66 moves into overlying relationship to the hook 36. As the wheel 66 continues to roll upwardly, the lip 22 serves as a fulcrum at the region of hook 36 about which the lever plank 34 turns, it being noted that the lever plank 34 ultimately assumes the horizontal position shown in FIG. 2 where both of the bars 46 and 48 engage the lip 22 such that the wheel 10 supports both the lever plank 34 and the wheel 66

During the tilting of the lever 34 the bevel 60 is tightly wedged into place between the lip 22 and the tire 26 and the bar 48 swings downwardly into engagement with the stop tongue 40 closing the breaker 38. The lower face of the breaker 38 thus applies a considerable downward force on the sidewall of the casing of the tire 26 adjacent the bead 28.

As the sidewall of the tire 26 is compressed the bead 28 descends along the rim 14 moving away from the shoulder 18 until the bead 28 moves past the shoulder 18 spaced below the latter and spaced radially outwardly of the hub 12 as shown in FIG. 2. This action serves to effectively break the entire bead.

Figure 5:
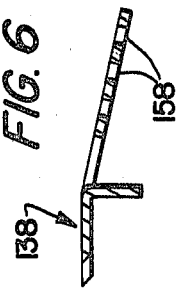
FIG. 5 is an enlarged view showing the bottom of a modified breaker.
Figure 6:
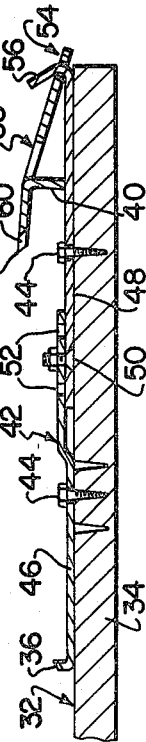
FIG. 6 is a cross sectional view taken on line 6—6 of FIG. 5.

In FIGS. 5 and 6 a modified form of breaker 138 is illustrated. The breaker 138 differs from the breaker 38 only in the provision of a number of slots 158 each adapted to receive the terminus 56 to accommodate wheels 10 of differing diameters. In such a case the bar 48 is removed from lever plank 34 and the breaker 138 is slid off the bar 48, whereupon the breaker is repositioned on the terminus 56 using a different slot 158, positioned for accommodating a different desired tire width. In this modified form of the invention, the terminus 56 and breaker slots 158 are preferably sized such that the breaker 138 cannot be simply shifted off the free end of the terminus 54, but rather bar 48 must be detached as described. This enhances the safety of the FIGS. 5-6 embodiment.

Having thus described the invention, what is claimed as new and desired to be secured by Letters Patent is:

1. A bead breaker tool for separating a circular tire bead from the adjacent circular lip of a supporting wheel, said bead defining a central opening having a predetermined diameter, said tool comprising:
   an elongated lever;
   a lip-engaging hook secured to said lever;
   a breaker element including a tire-engaging end;
   means swingably mounting said breaker element on said lever in spaced relationship to said hook,
   the terminus of said hook and said breaker being oriented in a generally opposed, facing relationship, and spaced apart a distance greater than said pre-determined opening diameter, for wedging of the breaker element between the wheel and bead in generally opposed relation to the hook and on the same side of said tire as the hook
   means for applying a force to said lever at a point thereon spaced from said hook in a direction toward said breaker element, for displaying the end of said lever adjacent said breaker element toward said tire; and
   a stop for limiting the extent of swinging movement of the breaker toward the lever during application of said force to the lever.

2. The tool as set forth in claim 1, said mounting means comprising a hinge, said hinge including a terminus carried by the lever, said breaker having a terminus-receiving slot.

3. The tool as set forth in claim 2, said breaker having a plurality of slots therein each adapted to receive said terminus.

4. The tool as set forth in claim 1, said lever including a pair of separable interconnected bars, said hook being integral with one of the bars, and said mounting means connecting said breaker element with the other of said bars.

5. The tool as set forth in claim 1, said tire-engaging end of said breaker element being flattened and configured to present a concavity therein generally conforming to the circular configuration of said lip.

6. The tool as set forth in claim 5, the end of said breaker element nearest said hook being configured to present a lip-engaging bevel on one face thereof to define a relatively thin, terminal edge.

7. The tool as set forth in claim 1, said stop being located intermediate the ends of said breaker element and between the breaker element and said lever.

8. The tool as set forth in claim 7, said stop comprising a tongue integral with the breaker element and projecting therefrom toward the lever.

9. The tool as set forth in claim 1, said lever including an elongated plank.

10. The tool as set forth in claim 1, said hook being rigidly secured to said lever.

11. The tool as set forth in claim 1, said point being located between said hook and breaker element.

12. For use with a wheel having a central hub provided with an annular rim having a continuous, inwardly-facing shoulder terminating in a circular outturned lip, and a tire having a bead in surrounding engagement with the rim and bearing against the shoulder, a tool for breaking the bead away from the rim and the shoulder, said tool comprising:
   an elongated lever provided with a lip-engaging hook;
   a breaker spaced from the hook for wedging between the shoulder and the bead in generally opposed relation to the hook when a force is applied to the lever;
   a hinge swingably connecting the breaker and the member, said hinge including a terminus carried by the lever said breaker having a plurality of slots therein each adapted to receive said terminus; and
   a stop for limiting the extent of swinging movement of the breaker toward the lever during application of said force.

13. For use with a wheel having a central hub provided with an annular rim having a continuous, inwardly-facing shoulder terminating in a circular outturned lip, and a tire having a bead in surrounding engagement with the rim and bearing against the shoulder, a tool for breaking the bead away from the rim and the shoulder, said tool comprising:
   an elongated lever including an extensible support having a pair of releasably interconnected bars;
   a lip-engaging hook integral with one of the bars;
   a breaker spaced from the hook for swinging between the shoulder and the bead in generally opposed relation to the hook when a force is applied to the lever;
   a hinge swingably connecting the breaker with the other of said bars, said hinge including a terminus on said other bar, said breaker having a terminus-receiving slot; and
   a stop for limiting the extent of swinging movement of the breaker toward the lever during application of said force.

* * * * *